United States Patent
Dries et al.

(10) Patent No.: US 6,558,808 B1
(45) Date of Patent: May 6, 2003

(54) HEAT-SEALABLE, POLYOLEFINIC MULTILAYER FILM, PROCESS FOR THE PRODUCTION THEREOF, AND THE USE THEREOF

(75) Inventors: Thomas Dries, Schwabenheim (DE); Walter Spaleck, Liederbach (DE); Andreas Winter, Glashütten (DE)

(73) Assignee: Basell Polyolefine GmbH (DE)

( * ) Notice: Subject to any disclaimer, the term of this patent is extended or adjusted under 35 U.S.C. 154(b) by 0 days.

(21) Appl. No.: 08/395,371

(22) Filed: Feb. 21, 1995

(30) Foreign Application Priority Data

Feb. 21, 1994 (DE) .......................... 44 05 429
Mar. 3, 1994 (DE) .......................... 44 06 931

(51) Int. Cl.$^7$ .............................. B32B 27/32
(52) U.S. Cl. ................... 428/516; 428/215; 53/277; 264/173.14; 264/173.15; 264/173.19
(58) Field of Search ................. 428/515, 910, 428/516, 500, 215; 526/127; 556/53; 264/173.19, 173.14, 173.15; 53/477

(56) References Cited

U.S. PATENT DOCUMENTS

| | | | |
|---|---|---|---|
| 4,294,889 A | * 10/1981 | Hashimoto | 428/515 |
| 4,622,237 A | 11/1986 | Lori | |
| 5,145,819 A | 9/1992 | Winter et al. | 502/117 |
| 5,175,049 A | * 12/1992 | Huff et al. | 428/218 |
| 5,206,075 A | 4/1993 | Hodgeson, Jr. | 428/216 |
| 5,236,622 A | 8/1993 | Yoneda et al. | |
| 5,252,384 A | 10/1993 | Bothe et al. | 428/212 |
| 5,278,264 A | 1/1994 | Spaleck et al. | 526/127 |
| 5,281,679 A | * 1/1994 | Jejelowo et al. | 526/114 |
| 5,328,969 A | 7/1994 | Winter et al. | 526/127 |
| 5,329,033 A | 7/1994 | Spaleck et al. | 556/53 |
| 5,350,817 A | 9/1994 | Dolle et al. | |
| 5,366,796 A | * 11/1994 | Murschall et al. | 428/216 |
| 5,374,752 A | 12/1994 | Winter et al. | 556/11 |
| 5,468,440 A | * 11/1995 | McAlpin et al. | 264/291 |

FOREIGN PATENT DOCUMENTS

| | | |
|---|---|---|
| AU | 604 582 | 6/1989 |
| CA | 1 317 411 | 5/1993 |
| CA | 2084016 | 5/1993 |
| CA | 2084017 | 5/1993 |
| CA | 1 319 784 | 6/1993 |
| CA | 1 319 785 | 6/1993 |
| CA | 2095100 | 10/1993 |
| CA | 2099214 | 12/1993 |
| DE | 43 11 422 | 10/1994 |
| EP | 0 318 049 | 5/1989 |
| EP | 0 484 817 | 5/1992 |
| EP | 0 516 018 | 12/1992 |
| EP | 0 580 377 | 1/1993 |
| EP | 0 549 900 | 7/1993 |
| GB | 1 145 199 | 6/1967 |
| GB | 2 201 407 | 9/1988 |

OTHER PUBLICATIONS

Schut, Plastics Technology, "Enter a New Generation of Polyolefins", pp 15–17, Nov. 1991.*
Kunststoffe–Handbuch, Band IV.
Ullmanns Encyklopadie der techn. Chemie, Dec. 28, 1976, pp. 525–555.

* cited by examiner

Primary Examiner—D. Lawrence Tarazano
(74) Attorney, Agent, or Firm—Connolly Bove Lodge & Hutz, LLP

(57) ABSTRACT

The disclosed heat-sealable, layered film comprises a polyolefinic base layer and at least one outer layer. The outer layer comprises a propylene-olefin copolymer prepared by means of a metallocene catalyst. The film is prepared by coextruding melts corresponding to the individual layers of the film, taking off the coextruded film over a take-off roll whose temperature is between 10 and 90° C., biaxially stretching and then heat-setting the resulting film, and optionally corona- or flame-treating the film, then winding it up in a wind-up unit.

19 Claims, No Drawings

HEAT-SEALABLE, POLYOLEFINIC MULTILAYER FILM, PROCESS FOR THE PRODUCTION THEREOF, AND THE USE THEREOF

FIELD OF THE INVENTION

The present invention relates to a heat-sealable film comprising a polyolefinic base layer and at least one outer layer. An aspect of this invention relates to a process for the production of the heat-sealable film. A further aspect of this invention relates to the use of the film.

DESCRIPTION OF THE PRIOR ART

Polyolefin films have been widely used in the past as packaging films. The success of these materials is based on the good optical and mechanical properties and the simple weldability of the films. The simple "welding" process for sealing film packages requires a heating device, for example in the form of an incandescent wire, which is brought into contact with the film layers and results in complete softening of these film layers. When the molten region cools, the weld seam forms. In order to achieve good welding, it is necessary that the surfaces pressed onto one another in the weld seam achieve the temperature of the crystallite melting point of the polyolefin used.

In addition to welding, heat-sealing of films has increased in importance. In this method, the film layers are laid one on top of the other and only warmed from 10 to 20° C. below the crystallite melting point, i.e. the films are not completely melted. The adhesion achieved is significantly less than in welding of the same material, but is sufficient for many applications (Kunststoff-Handbuch, Volume IV, Carl Hanser Verlag Munich, 1969, pages 623 to 640).

The literature discloses multilayer films which are provided with heat-sealable layers of random copolymers or terpolymers of propylene and other α-olefins or corresponding polymer blends.

These heat-sealable layers enable the use of films on modern packaging machines. The operating speeds of these machines have been constantly increased in the past, meaning that the requirements of the film properties have also become greater and greater. In particular, the heat-sealing and hot-tack properties of the film are particularly crucial, since the strength of the seal seam must not be impaired for relatively short sealing times. The film must run well over the machine at high speeds and must not block or stick to the sealing jaws or other machine parts in the region of the seal zone.

Furthermore, packaging films should be readily printable and readily metallizable. Additional requirements arise from the new EC directives on foodstuff packaging, which relate to migration of oligomers or additives present in the raw material. Finally, there is a basic need for packaging films to be produced as cheaply as possible.

These multivarious requirements of heat-sealable materials have in the past resulted again and again in new improved heat-sealable raw materials, such as, for example, copolymers and terpolymers of ethylene and/or propylene.

For example, it is known that the minimum heat-sealing temperature can be reduced by increasing the comonomer content.

However, this is technically complex and expensive for a number of reasons.

1. With the increase in the comonomer content, in particular the $C_2$ content, the probability of incorporation of the ethylene in blocks increases. On the other hand, only the comonomers incorporated randomly predominantly contribute to the reduction in the minimum heat-sealing temperature.
2. High incorporated comonomer contents require a high comonomer supply in the polymerization reactor, which cannot be achieved inexpensively in all polymerization technologies.
3. Random copolymers having a high comonomer content, in particular a $C_2$ content, exhibit a strong tendency toward sticking due to low-molecular-weight components inevitably formed during the polymerization. These result in coating s formation in the polymerization reactor and must be removed in a second process step by solvent expansion. Both make the product more expensive.

DE-A-16 94 694 describes heat-sealable layered materials comprising a polypropylene base film with a heat-sealable thermoplastic layer strongly adhering thereto. This layer comprises a copolymer of from 98 to 94% by weight of propylene and from 2 to 6% by weight of ethylene. The film described has significantly better heat-sealing properties than polypropylene films or known heat-sealable coatings, such as PE, PVC or PVA. According to the examples, the minimum heat-sealing temperature of these heat-sealable layers is above 126° C.

EP-A-0 318 049 describes crystalline copolymers of propylene with ethylene and/or α-olefins which contain from 2 to 10 mol % of ethylene and/or α-olefins. The melting point of these copolymers is in the range from 110 to 140° C. The solubility in xylene is less than 10% by weight at 25° C., and the intrinsic viscosity in tetralin at 135° C. is greater than 0.2 dl/g. The copolymers have improved mechanical properties and improved welding properties and are therefore suitable for the production of films.

EP-A-0 484 817 describes a propylene film having outer layers of syndiotactic polypropylene. These films are said to have a balanced property profile, in particular good heat-sealing properties and good optical properties, but problems frequently occur during stretching of this material, for example caused by cracking in the syndiotactic outer layers or by delamination of the outer layers from the isotactic core layer. These problems are due firstly to the lower stretchability of the syndiotactic polypropylene and secondly to the lower compatibility of syndiotactic and isotactic polypropylene.

One of the most important objectives of the present invention is to avoid the disadvantages of the films previously described in the prior art. In particular, the objective is to provide a multilayer film which is distinguished by a combination of the following properties:

high gloss low haze a low minimum heat-sealing temperature good seal seam strength good hot-tack properties low migration values good corona resistance low production costs.

SUMMARY OF THE INVENTION

According to the present invention, a highly useful combination of properties is achieved in a film, having a plurality of layers, in which an outer layer comprises a propylene-olefin copolymer prepared by means of a metallocene catalyst. The core or base layer is preferably a propylene polymer containing at least 90% propylene units and having a melt flow index of from 0.5 g/10 min. to 8 g/10 min., measured in accordance with DIN 53 735, and a melting point of from 150 to 170° C., The aforementioned outer layer is preferably an essentially random copolymer containing from 0.1 to 10% by weight, preferably 1 to 7% by weight, of an olefinic co-monomer of the formula RCH=CHR', where R and R' are H or $C_1$–$C_{10}$-alkyl or alkenyl (straight- or branched-chain), the total number of carbon atoms in the co-monomer typically being not more than 10. In a preferred embodiment, at least one of R and R' is H and preferably both are H. The mean molecular weight, both weight average ($M_w$) and number average ($M_n$) of the essentially random copolymer is preferably at least $5 \cdot 10^4$, and the molecular weight dispersity ("polydispersity" or $M_w/M_n$) is less than 7, preferably <5, optimally <3. Other preferred properties of the essentially random copolymer include the following:

| | |
|---|---|
| DSC melting point: | 100 to 146° C. |
| Melt flow index (MFI), measured in accordance with DIN 53 735: | 0.5 to 100 g/10 min (230° C., load = 21.6 N) |
| Hexane-extractable content, measured in accordance with FDA 1771520: | <3% by weight |
| Viscosity number (VN): | 50 to 1000 cm$^3$/g. |

It is preferred that the essentially random copolymer possess as many of these properties as possible, at least two of the above-described properties being preferred, a typical combination of these properties being: a random monomer content within the stated range along with a melting point within the stated range and preferably also a melt flow index and/or molecular weight dispersity within the stated ranges.

Preferred films of this invention are multilayer (e.g. ≧3-layer) coextrudates in which an outer layer has a thickness of from 0.1 to 2.5 μm. These films are particularly useful in the field of packaging and can be transparent, opaque, white or white and opaque, depending upon how they are used.

Layered films of this invention are preferably obtained by a coextruding through a flat-film die, followed by solidification on a take-off roll, and biaxial stretching. The biaxially-stretched film is heat-set and then wound up by a wind-up unit. The temperature of the take-off roll should be in the range of 10 to 90° C.

DETAILED DESCRIPTION

As used in this application, the term "polymer" is intended to be inclusive of both homopolymers and copolymers, and the term "copolymer" is intended to be inclusive of two-unit copolymers, terpolymers, quaterpolymers, etc.

The term "essentially random copolymer" means that the copolymer contains at least about 0.1% by weight of random comonomer, and the major amount of the polymer is in random rather than block form. The random co-monomer content can be determined by IR spectroscopy, as can the random factor (R). It is preferred that the ratio of block content to random content be as low as possible, e.g. <0.4. It is also preferred that the "essentially random copolymer" be essentially free of low molecular weight components which have a tendency to form deposits on reactor walls during polymerization. The random copolymers used in outer layers of films of this invention are very low in hexane-extractable content, as indicated above.

The base layer of the novel multilayer film essentially comprises a polyolefin, preferably a propylene polymer, and, if desired, further additives in effective amounts in each case. In general, the base layer comprises at least 50% by weight, preferably from 75 to 100% by weight, in particular from 90 to 100% by weight, of the propylene polymer.

The propylene polymer generally comprises from 90 to 100% by weight, preferably from 95 to 100% by weight, in particular from 98 to 100% by weight, of propylene and generally has a melting point of 120° C. or above, preferably from 150 to 170° C., and generally has a melt flow index of from 0.5 to 8 g/10 min, preferably from 2 to 5 g/10 min, at 230° C. and a force of 21.6 N (DIN 53 735). Isotactic propylene homopolymers having an atactic content of 15% by weight or less, copolymers of ethylene and propylene having an ethylene content of 10% by weight or less, copolymers of propylene and $C_4$–$C_8$-α-olefins having an α-olefin content of 10% by weight or less, terpolymers of propylene, ethylene and butylene having an ethylene content of 10% by weight or less and a butylene content of 15% by weight or less are preferred propylene polymers for the core layer, particular preference being given to isotactic propylene homopolymers. The percentages by weight given are based on the particular polymer.

Also suitable is a mixture of said propylene homopolymers and/or copolymers (optionally including terpolymers) and other polyolefins, in particular comprising monomers having 2 to 6 carbon atoms, where the mixture comprises at least 50% by weight, in particular at least 75% by weight, of propylene polymer. Other polyolefins which are suitable in the polymer mixture are polyethylenes, in particular HDPE, LDPE and LLDPE, where the proportion of these polymers does not exceed 15% by weight in each case, based on the polymer mixture.

The base layer in opaque, white or white and opaque films can additionally contain up to 40% by weight, preferably up to 30% by weight, based on the total weight of the base layer, of the inert particulate material having a mean particle diameter in the range from 0.01 to 8 μm, especially from 0.02 to 2.5 μm. The presence of the inert particulate material having a particle size of from 1 to 8 μm causes the formation of microcracks and microcavities, known as voids, between the polymer matrix and the inert material during stretch orientation of the film at suitable temperatures; visible light is refracted in the region of these voids, giving the film an opaque appearance, which makes it particularly suitable for certain packaging purposes, in particular in the foodstuffs sector. The inner particulate material can be of an inorganic or organic nature. Calcium carbonate, aluminum silicate, silicon dioxide and titanium dioxide are particularly suitable inorganic materials, and polyethylene terephthalate, polybutylene terephthalate, polyesters, polyamides and polystyrenes are particularly suitable organic materials, it thus also being possible to combine various inorganic and/or organic particles.

The modification of the base layer in the stated manner is known per se and is carried out as described in DE-A-43 11 422, which is expressly incorporated herein by way of reference.

Particle types, the amount thereof employed, the modification thereof by coating, etc., are described in detail therein.

In a preferred embodiment, the core layer may furthermore contain resins and/or antistatics. The corresponding resins and antistatics are described below together with further additives.

The novel multilayer film may contain (a) further interlayer(s) between the base layer and the outer layer. This (these) interlayer(s) which may be present essentially comprise(s) propylene polymers or polypropylene mixtures, as described above for the base layer. In principle, the base layer and the interlayer(s) can comprise the same or different propylene polymers or mixtures. The melt flow indices of the polymers for the core layer and interlayer(s) are preferably as close as possible in magnitude. If necessary, the MFI of the interlayer(s) can be somewhat higher, with a maximum difference of 20%. If desired, additives in effective amounts in each case can be added to the interlayers.

In a further advantageous embodiment, the propylene polymers employed in the base layer and/or interlayer are partially degraded by the addition of organic peroxides. A measure of the degree of degradation of the polymer is the degradation factor A, which gives the relative change in melt flow index, measured in accordance with DIN 53 735, of the polypropylene, based on the starting polymer.

$$A = \frac{MFI_2}{MFI_1}$$

$MFI_1$ = melt flow index of the propylene polymer before addition of the organic peroxide $MFI_2$ = melt flow index of the peroxidically degraded propylene polymer.

According to the invention, the degradation factor A of the propylene polymer employed is in a range from 3 to 15, preferably from 6 to 10.

Particularly preferred organic peroxides are dialkyl peroxides, where the term alkyl radical is taken to mean a conventional saturated, straight-chain or branched lower alkyl radical having up to six carbon atoms. Particular preference is given to 2,5-dimethyl-2,5-di(t-butylperoxy) hexane and di-t-butyl peroxide.

The outer layer in a layered film of this invention comprises a random propylene-olefin copolymer which has been prepared by means of metallocene catalysts and gives the film an exceptionally low minimum heat-sealing temperature as well as other very good film properties. In particular, the film containing the novel heat-sealable layer is distinguished by improved, i.e. lower, haze and surprisingly good corona resistance. The global migration of the film is likewise significantly improved.

The copolymer is prepared by copolymerization of propylene with an olefin, preferably an olefin of the formula RCH=CHR', where R and R' are H, lower alkyl, or alkylene, R=R'=H(ethylene) being particularly preferred or, less preferably, 1-olefins where R=$C_1$–$C_{10}$ (straight- or branched-chain) alkyl and R'=H, the polymerization being carried out in the presence of a catalyst comprising a metallocene, generally in combination with a cocatalyst. However, the preparation of these copolymers itself is not the subject-matter of the present invention. The corresponding processes have already been described in EP-A-0 302 424, EP-A-0 336 128 and EP-A-0 336 127, which are expressly incorporated herein by way of reference (the olefins which can be employed as comonomers are also mentioned therein).

a) Catalyst

Suitable catalysts for the preparation of copolymers are in principle all metallocene catalysts by means of which isotactic polypropylene having an industrially relevant molecular weight (Mw>100,000 g/mol) can also be prepared at industrially relevant process temperatures (>40° C.). These metallocenes can be supported or employed in homogeneous form. Suitable cocatalysts are aluminoxanes or other bulky, non-coordinating anions, and it may furthermore be advantageous to add trialkylaluminum compounds to the polymerization system. Particularly suitable metallocenes are those of the formula below. These metallocenes are described, inter alia, in EP-A-0 485 823, BP-A-0 530 647, EP-A-0 545 303, EP-A-0 545 304, EP-A-0 549 900, EP-A-0 576 970. Particularly suitable metallocene supports are described, for example, in EP-A-0 567 952. Preference is given to metallocenes carrying, as ligands, substituted or unsubstituted indenyl groups bonded to one another via a heteroatom-containing bridge ($M^1$). Particular preference is given to the metallocenes of the formula

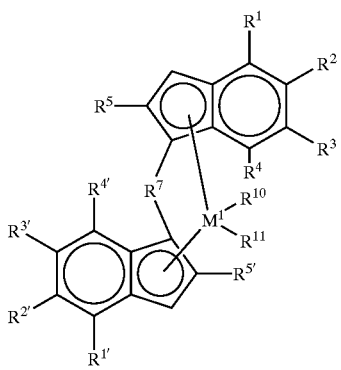

in which $M^1$ is titanium, zirconium, hafnium, vanadium, niobium or tantalum, $R^1$, $R^2$, $R^3$, $R^4$ and $R^5$ and $R^{1'}$, $R^{2'}$, $R^{3'}$, $R^{4'}$ and $R^{5'}$ are identical or different and are hydrogen, ($C_1$–$C_{20}$)alkyl, ($C_6$–$C_{14}$)aryl, ($C_1$–$C_{10}$)alkoxy, ($C_2$–$C_{10}$)alkenyl, ($C_7$–$C_{20}$)arylalkyl, ($C_7$–$C_{20}$)alkylaryl, ($C_6$–$C_{10}$) aryloxy, ($C_1$–$C_{10}$)fluoroalkyl, ($C_6$–$C_{10}$)haloaryl, ($C_2$–$C_{10}$)alkynyl, an —$SiR^6_3$ radical, where $R^6$ is ($C_1$–$C_{10}$)alkyl, or are a halogen atom or a heteroaromatic radical having 5 or 6 ring members and possibly containing one or more heteroatoms, or at least two adjacent radicals of $R^1$–$R^4$ or $R^{1'}$–$R^{4'}$, together with the atoms connecting them, form a ring system,

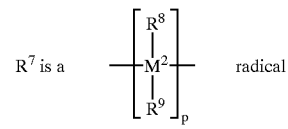

where $M^2$ is silicon, germanium or tin, $R^8$ and $R^9$ are identical or different and are hydrogen, ($C_1$–$C_{20}$)alkyl, ($C_6$–$C_{14}$)aryl, ($C_1$–$C_{10}$)alkoxy, ($C_2$–$C_{10}$)alkenyl, ($C_7$–$C_{20}$)arylalkyl, ($C_7$–$C_{20}$) alkylaryl, ($C_6$–$C_{10}$)aryloxy, ($C_1$–$C_{10}$)fluoroalkyl, ($C_6$–$C_{10}$) haloaryl, ($C_2$–$C_{10}$)alkynyl or halogen, or $R^8$ and $R^9$, together with the atom connecting them, form a ring, p is 0, 1, 2 or 3, and $R^{10}$ and $R^{11}$ are identical or different and are hydrogen, ($C_1$–$C_{10}$)alkyl, ($C_1$–$C_{10}$) alkoxy, ($C_6$–$C_{10}$)aryl, ($C_6$–$C_{10}$)aryloxy, ($C_2$–$C_{10}$) alkenyl ($C_7$–$C_{40}$)arylalkyl, ($C_7$–$C_{40}$)alkylaryl, ($C_8$–$C_{40}$)arylalkenyl, hydroxyl or a halogen atom.

b) Polymerization Processes

The copolymers can be prepared by all known process variants for the preparation of polypropylene, i.e. bulk polymerization of liquid propylene, gas-phase polymerization, suspension polymerization or solution polymerization in an inert diluent and high-pressure polymerization in supercritical propylene, in each case in single- or multistep, batch or continuous process variants. The process conditions which can be selected can be a pressure of between 2 and 2000 bar and between 40 and 250° C. Comonomers which can be used in this polymerization process are ethylene or other 1-olefins, described above, including 1-butene, 1-hexene, 1-octene, 1-decene, etc., and 4-methyl-1-pentene, particular preference being given to ethylene.

The comonomer (e.g. ethylene) content during the polymerization is between 0.1 and 15% by weight, preferably between 1 and 7% by weight, in particular between 2 and 6% by weight, in each case based on the weight of the mixture of propylene and comonomer (e.g. a mixture of propylene and ethylene). This comonomer content is predominantly incorporated randomly through the use of the new catalyst system, so the copolymer has a very low ratio of block content to random content. The ratio is generally less than 0.4, preferably in the range from 0.05 to 0.3, in particular in the range from 0.05 to 0.2.

Furthermore, the individual polymer chains have a particularly narrow distribution of the incorporation rate. Prochiral comonomers are incorporated stereospecifically. The nature and frequency of the occurrence of incorporation faults are characteristic of these random copolymers and differ from those of products described hitherto. The novel features at the level of the polymer chains are presumably the cause of the surprisingly good properties of the copolymer with respect to its use as a heat-sealable raw material. These characteristic molecular features are particularly pronounced when the particularly suitable metallocenes described previously, are employed for the preparation of the copolymer. These metallocenes are preferably those carrying, as substituted or unsubstituted ligands, substituted or unsubstituted indenyl groups bonded to one another by a heteroatom-containing bridge.

Other parameters which are suitable for characterization of the copolymer are shown in Table 1 below.

TABLE 1

|  | Range | Preferred range | Particularly preferred range |
| --- | --- | --- | --- |
| Random factor according to IR [% by weight] | 0.01–0.4 | 0.05–0.3 | 0.05–0.2 |
| Random comonomer content according to IR [% by weight] | 0.05–12 | 1–7 | 2–6 |
| Mean molecular weight $M_w$ [g/mol] (weight average) | $5 \cdot 10^4$–$2 \cdot 10^6$ | $1 \cdot 10^5$–$1 \cdot 10^6$ | $2 \cdot 10^5$–$5 \cdot 10^5$ |
| Mean molecular weight $M_n$ [g/mol] (number average) | $5 \cdot 10^4$–$10^6$ | $5 \cdot 10^4$–$5 \cdot 10^5$ | $10^5$–$5 \cdot 10^5$ |
| Molecular weight dispersity $M_w/M_n$ | <7 | <5 | <3 |
| Melting point according to DSC [° C.] | 100–140 | 110–135 | 120–130 |

TABLE 1-continued

|  | Range | Preferred range | Particularly preferred range |
| --- | --- | --- | --- |
| Melt flow index MFI in accordance with DIN 53 735 [g/10 min] | 0.5–100 | 1–50 | 3–15 |
| Viscosity number VN [cm³/g] | 50–1000 | 100–500 | 120–300 |
| Hexane-extractable content according to FDA [% by weight] | <3 | <2 | <1 |

It is advantageous to select heat-sealable copolymers which satisfy at least two of the parameters shown in Table 1 above, for example by the melting point and a further parameter or by the random comonomer content and a further parameter. Copolymers which satisfy the melting point, melt flow index and/or molecular weight dispersity ($M_w/M_n$) parameters can be especially advantageous.

The use of the copolymers prepared by means of metallocene catalysts as heat-sealable layer raw material offers the following surprising advantages over conventional heat-sealable raw materials.

1. Production costs for heat-sealable films are lower since the copolymers can be prepared more cheaply by means of metallocene catalysts than can the conventional commercially available copolymers and terpolymers. These lower production costs are due to the fact that a lower comonomer content is necessary in order to achieve a comparable minimum heat-sealing temperature (compared with the prior art) and due to the fact that the copolymers can be prepared with a sufficiently narrow molecular weight distribution by means of metallocene catalysts without subsequent high-cost peroxidic degradation of the copolymer being necessary.
2. The novel films are distinguished by low extractable contents (hexane FDA 1771520) and by lower global migration, which makes them particularly suitable for use as foodstuff packaging.
3. The novel films have very good corona acceptance and resistance; impairment of the thermal-sealing properties by the corona treatment is low. In addition, the adhesion of printing inks, metal coatings, for example Al, and vapor-deposited, ceramic layers, such as, for example, of $Al_2O_3$ and $SiO_x$, is very good.
4. The optical properties glass and haze of the novel films are improved, resulting in an attractive appearance of the packaging.

Layered films of this invention have at least two layers and, as essential layers, they always include a base or core layer and at least one outer layer which satisfies one or preferably two or more of the criteria discussed above, and it is preferred that there be outer layers on both sides of the layered film. If desired, additional interlayers can be arranged between the base layer and the outer layer(s). The choice of the number of layers depends primarily on the proposed application, particular preference being given to three-, four- and five-layered embodiments.

The overall thickness of the film can vary within broad limits and depends on the intended use.

The preferred embodiments of the novel film have overall thicknesses of from 5 to 200 μm, preferably from 10 to 100 μm, in particular from 20 to 80 μm.

The thickness of any interlayer(s) present is, in each case independently of the others, from 2 to 12 µm, preferably from 3 to 8 µm, in particular from 3 to 6 µm. The values given each relate to one interlayer.

The thickness of the novel outer layer(s) is chosen independently of other layers and is preferably in the range from 0.1 to 10 µm, in particular from 0.3 to 5 µm, particularly preferably from 0.5 to 2 µm, where outer layers applied to both sides can be identical or different with respect to the thickness and the composition.

The thickness of the base layer results correspondingly from the difference between the overall thickness and the thickness of the outer layer(s) and the interlayer(s) applied and can therefore vary within broad limits analogously to the overall thickness.

In order further to improve certain properties of the novel polypropylene film, both the base layer and the interlayer(s) and the outer layer(s) can contain additives in an effective amount in each case, preferably a hydrocarbon resin and/or an antistatic and/or an antiblocking agent and/or lubricant and/or stabilizer and/or neutralizer, which additives are compatible with the polymers of the core layer and of the outer layer(s), with the exception of the antiblocking agents, which are generally incompatible. All amounts given below in weight percent (% by weight) are in each case based on the layer or layers to which the additive can be added.

A low-molecular-weight resin is preferably added to the base layer and/or interlayer(s). Hydrocarbon resins are low-molecular-weight polymers whose molecular weight is generally in a range of from 300 to 8000, preferably from 400 to 5000, especially from 500 to 2000. The molecular weight of the resins is thus significantly lower than that of the propylene polymers which form the principal component of the individual film layers and generally have a molecular weight of greater than 100,000. The proportion of the resin is in the range from 1 to 30% by weight, preferably from 2 to 10% by weight. The softening point of the resin is between 100 and 180° C. (measured in accordance with DIN 1995-U4, corresponding to ASTM E-28), preferably from about 120 to 160° C. Of the numerous low-molecular weight resins, hydrocarbon resins are preferred, particularly in the form of petroleum resins, styrene resins, cyclopentadiene resins and terpene resins (these resins are described in Ullmanns Encyklopädie der technischen Chemie [Ullmann's Encyclopedia of Industrial Chemistry], 4th Edition, Volume 12, pages 525 to 555).

The petroleum resins are those hydrocarbon resins prepared by polymerization of deep-decomposed petroleum materials in the presence of a catalyst. These petroleum materials usually contain a mixture of resin-forming substances, such as styrene, methylstyrene, vinyltoluene, indene, methylindene, butadiene, isoprene, piperylene and pentylene. The styrene resins are low-molecular weight homopolymers of styrene or copolymers of styrene with other monomers such as methylstyrene, vinyltoluene and butadiene. The cyclopentadiene resins are cyclopentadiene homopolymers or cyclopentadiene copolymers obtained from coal tar distillates and fractionated petroleum gas. These resins are prepared by keeping the materials containing cyclopentadiene at high temperature for a long time. Depending on the reaction temperature, dimers, trimers or oligomers can be obtained.

The terpene resins are polymers of terpenes, i.e. hydrocarbons of the formula $C_{10}H_{16}$, which are present in virtually all essential oils or oil-containing resins from plants, and phenol-modified terpene resins. Specific examples of terpenes which may be mentioned are pinene, α-pinene, dipentene, limonene, myrcene, camphene and similar terpenes. The hydrocarbon resins can also be so-called modified hydrocarbon resins. The modification is generally carried out by reaction of the raw materials before the polymerization, by the introduction of specific monomers or by reaction of the polymerized product, in particular by hydrogenation or partial hydrogenation.

Hydrocarbon resins employed are also styrene homopolymers, styrene copolymers, cyclopentadiene homopolymers, cyclopentadiene copolymers and/or terpene polymers having a softening point of in each case above 135° C. (in the case of unsaturated polymers, the hydrogenated product is preferred). Very particular preference is given in the interlayers to cyclopentadiene polymers having a softening point of 140° C. or above.

Preferred antistatics are alkali metal alkanesulfonates, polyether-modified, i.e. ethoxylated and/or propoxylated polydiorganosiloxanes (polydialkylsiloxanes, polyalkyl-phenylsiloxanes and the like) and/or essentially straight-chain and saturated aliphatic, tertiary amines containing an aliphatic radical having 10 to 20 carbon atoms which are substituted by ω-hydroxy-($C_1$–$C_4$)alkyl groups, N,N-bis(2-hydroxyethyl)alkylamines having 10 to 20 carbon atoms, preferably 12 to 18 carbon atoms, in the alkyl radical being particularly suitable. The effective amount of antistatic is in the range from 0.05 to 0.3% by weight.

Lubricants are higher aliphatic acid amides, higher aliphatic acid esters, waxes and metal soaps and polydimethylsiloxanes. The effective amount of lubricant is in the range from 0.1 to 3% by weight. Particularly suitable is the addition of higher aliphatic acid amides in the range from 0.15 to 0.25% by weight in the base layer and/or the outer layers. A particularly suitable aliphatic acid amide is erucamide. The addition of polydimethylsiloxanes is preferred in the range from 0.3 to 2.0% by weight, in particular polydimethylsiloxanes having a viscosity of from 10,000 to 1,000,000 $mm^2$/s.

Stabilizers which can be employed are conventional compounds which have a stabilizing action for polymers of ethylene, propylene and other α-olefins. Their added amount is between 0.05 and 2% by weight. Particularly suitable are phenolic stabilizers, alkali metal or alkaline earth metal stearates and/or alkali metal or alkaline earth metal carbonates. Phenolic stabilizers are preferred in an amount of from 0.1 to 0.6% by weight, in particular from 0.15 to 0.3% by weight, and having a molecular weight of greater than 500 g/mol. Pentaerythrityl tetrakis [3-(3,5-di-tert-butyl-4-hydroxyphenyl)propionate] and 1,3,5-trimethyl-2,4,6-tris(3,5-di-tert-butyl-4-hydroxybenzyl)benzene are particularly advantageous.

The antiblocking agents are preferably added to the outer layers. Suitable antiblocking agents are inorganic additives such as silicon dioxide, calcium carbonate, magnesium silicate, aluminum silicate, calcium phosphate and the like and/or incompatible organic polymers such as polyamides, polyesters, polycarbonates and the like. Preference is given to benzoguanamine-formaldehyde polymers, silicon dioxide and calcium carbonate. The effective amount of antiblocking agent is in the range from 0.1 to 2% by weight, preferably from 0.1 to 0.5% by weight. The mean particle size is between 1 and 6 µm, in particular 2 and 5 µm, particles having a spherical shape, as described in EP-A-0 236 945 and DE-A-38 01 535, being particularly suitable.

Neutralizers are preferably calcium stearate and/or calcium carbonate having a mean particle size of at most 0.7 µm, an absolute particle size of less than 10 µm and a specific surface area of at least 40 $m^2$/g.

The invention furthermore relates to a process for the production of the multilayer film according to the invention by the coextrusion process, which is known per se. This process is carried out by coextruding the melts corresponding to the individual layers of the film through a flat-film die, taking off the resultant film over one or more rolls for solidification, subsequently, if desired, biaxially stretching (orienting) the film, heat-setting the biaxially stretched film and, if desired, appropriately flame-treating the surface layer intended for corona treatment.

Biaxial stretching (orientation) is preferred and can be carried out simultaneously or consecutively, consecutive biaxial stretching, in which stretching is carried out first longitudinally (in the machine direction) and then transversely (perpendicular to the machine direction), being particularly favorable.

First, as is customary in coextrusion, the polymer or polymer mixture of the individual layers is compressed and liquefied in an extruder, it being possible for any additives added to be already present in the polymer. The melts are then pressed simultaneously through a flat-film die (slot die), and the extruded multilayer film is drawn off over one or more take-off rolls, where it cools and solidifies.

The resultant film is preferably then stretched longitudinally and transversely to the extrusion direction, which results in alignment of the molecule chains. The stretching is preferably from 4:1 to 7:1 in the longitudinal direction and from 6:1 to 11:1 in the transverse direction. The longitudinal stretching is expediently carried out with the aid of two rolls running at different speeds corresponding to the desired stretching ratio, and the transverse stretching is expediently carried out with the aid of an appropriate tenter frame.

Biaxial stretching of the film is followed by heat-setting (heat treatment), the film being kept at a temperature of from 110 to 130° C. for about 0.5 to 10 seconds. The film is subsequently wound up in the conventional manner by means of a wind-up unit.

It has proven particularly favorable to keep the take-off roll or rolls, by means of which the extruded film is also cooled and solidified, at a temperature of from 10 to 90° C., preferably from 20 to 60° C.

In addition, the longitudinal stretching is advantageously carried out at a temperature below 140° C., preferably in the range from 125 to 135° C., and the transverse stretching at a temperature above 140° C., preferably from 145 to 160° C.

If desired, one or both surfaces of the film can, as mentioned above, be corona- or flame-treated by one of the known methods after the biaxial stretching. For flame treatment with a polarized flame (cf. U.S. Pat. No. 4,622,237), a direct electric voltage is applied between a burner (negative pole) and a chill roll. The level of the applied voltage is between 500 and 3000 V, preferably in the range from 1500 to 2000 V. The applied voltage gives the ionized atoms increased acceleration, and they hit the polymer surface with greater kinetic energy. The chemical bonds within the polymer molecule are more easily broken, and formation of free radicals proceeds more rapidly.

Heating of the polymer here is substantially less than in the case of standard flame treatment, and films can be obtained in which the heat-sealing properties of the treated side are even better than those of the untreated side.

For the alternative corona treatment, the film is passed between two conductor elements serving as electrodes, such a high voltage, usually alternating voltage (about 10,000 V and 10,000 Hz), being applied between the electrodes that spray or corona discharges can occur. The spray or corona discharge ionizes the air above the film surface and reacts with the molecules of the film surface, causing formation of polar inclusions in the essentially non-polar polymer matrix. The treatment intensities are within the usual range, preferably from 38 to 45 mN/m.

The novel multilayer film is distinguished by very good heat-sealing properties, in particular a very low minimum heat-sealing temperature for comparable low comonomer contents and a good seal seam strength and good hot-tack properties. The heat-sealing properties of particularly advantageous embodiments of the film are advantageously characterized by quoting the following equation, which characterizes the minimum sealing temperature of the non-corona-treated side of the film as a function of the random ethylene content ($C_2$ in % by weight):

$$MST \leq T_0 - D \cdot C_2$$

where $T_0 = 120°$ C.; $D = 3°$ C. and $0.1 \leq C_2 \leq 10$

It is evident from this equation that low minimum sealing temperatures can also be achieved at a very low ethylene content in the copolymer. If desired, the minimum sealing temperature can be reduced still further if the ethylene content is increased, achieving values which are extremely low for $C_2/C_3$ copolymers.

At the same time, the an outer layer selected according to the principles of this invention enables higher sheen values to be achieved, and the disadvantageous haze caused by coating with conventional heat-sealable copolymers or terpolymers can be more advantageously reduced, unless an opaque embodiment is being used. This outer layer material enables the production of heat-sealable films having longer corona resistance and lower global migration, the known disadvantages of conventional outer layer materials comprising copolymers or terpolymers being avoided (high price, impairment of sheen and transparency, technical aspects of the process, etc.).

The invention is now described in greater detail by means of working examples:

A. PREPARATION OF THE COPOLYMERS

EXAMPLE 1 a) Catalyst:

The metallocene rac-dimethylsilanediylbis(2-methyl-4,5-benzoindenyl)zirconium dichloride, prepared as described in EP-A-0 549 900, Example 1, is converted into a supporting catalyst analogously to the procedure in EP-A-0 567 952, Example 10.

b) Polymerization:

A dry 70 dm$^3$ reactor was flushed first with nitrogen and subsequently with propylene and filled with 40 dm$^3$ of liquid propylene. 100 cm$^3$ of a solution of 20% by weight of triisobutylaluminum in hexane (Witco GmbH) were then added with stirring, the reactor was heated to 30° C., and 60 g of ethylene were metered in. 2160 mg of supported catalyst as per a) were then added, and the temperature in the reactor was increased to 60° C. over the course of 10 minutes. A further 140 g of ethylene were metered in continuously over the course of the next 120 minutes, and the temperature of the system was kept at 60° C. with stirring. The reaction was then terminated by the addition of 10 cm$^3$ of isopropanol, the propylene was removed by degassing, and the resultant polymer powder was removed and dried, giving 4.7 kg of product, MFI (determined at 230° C. and 21.6 N)=7.3 g/10 min, ethylene content according to IR 3.3% by weight.

c) Granulation:

5 batches carried out in accordance with procedure b) were combined, stabilized by means of 0.2% by weight of ®Hostanox PAR 24, 0.1% by weight of ®Irganox 1010 and 0.05% by weight of calcium stearate and granulated after addition of 0.3% by weight of ®Sylobloc 44. The resultant granules had an, MFI 230/2.16 of 6.0 g/10 min, a melting point of 128.2° C. and an ethylene content, according to IR, of 3.0% by weight.

EXAMPLE 2

The copolymer was prepared analogously to Example 1.
a) Catalyst:
The catalyst was prepared in the same way as in Example 1.
b) Polymerization:
The polymerization was carried out as in Example 1, but the 140 g of ethylene were replaced by 250 g of ethylene metered in under the stated conditions, i.e. over the course of 120 minutes and at 600° C. 4.8 kg of product were obtained having an MFI of 9.9 g/10 min (determined at 230° C. and 21.6 N) and having an ethylene content, according to IR, of 5.0% by weight, based on the weight of the polymer.
c) Granulation:
The granulation was carried out in the same way as in Example 1. The resultant granules had an MFI of 9.0 g/10 min, a melting point of 123.9° C. and an ethylene content, according to IR, of 5.0% by weight.

EXAMPLE 3

The copolymer was prepared analogously to Example 1.
a) Catalyst:
The catalyst was prepared in the same way as in Example 1.
b) Polymerization:
The polymerization was carried out as in Example 1, but the 140 g of ethylene were replaced by 300 g of ethylene metered in under the stated conditions, i.e. over the course of 120 minutes and at 60° C. 4.5 kg of product were obtained having an MFI of 2.8 g/10 min (determined at 230° C. and 21.6 N) and having an ethylene content, according to IR, of 5.6% by weight, based on the weight of the polymer.
c) Granulation:
The granulation was carried out in the same way as in Example 1. The resultant granules had an MFI of 19.0 g/10 min, a melting point of 121.6° C. and an ethylene content, according to IR, of 5.3% by weight.

EXAMPLE 4

The copolymer was prepared analogously to Example 1.
a) Catalyst:
The metallocene rac-dimethylsilanediylbis(2-methyl-4-phenylindenyl)zirconium dichloride, prepared as described in EP-A-0 576 970, Example 1, is converted into a supporting catalyst analogously to the procedure in EP-A-0 567 952, Example 10.
b) Polymerization:
The polymerization was carried out in the same way as in Example 1, but the 2160 mg of supporting catalyst as per a) were replaced by only 1240 mg. The subsequent increase in temperature to 60° C. over the course of 10 minutes was likewise carried out as in Example 1. In addition, the 140 g of ethylene metered in were replaced by 330 g of ethylene under the stated conditions, i.e. over the course of 120 minutes and at 60° C. 25.2 kg of product were obtained having an MFI of 12.1 g/10 min (determined at 230° C. and 21.6 N) and having an ethylene content, according to IR, of 6.1% by weight, based on the weight of the polymer.

c) Granulation:
The granulation was carried out in the same way as Example 1. The resultant granules had an MFI of 11.0 g/10 min, a melting point of 128.2° C. and an ethylene content, according to IR, of 6.0% by weight.

EXAMPLE 5

The copolymer was prepared analogously to Example 1.
a) Catalyst:
The catalyst was prepared in the same way as in Example 1.
b) Polymerization:
The polymerization was carried out as in Example 1, but the 60 g ethylene that were metered in first were replaced by 2 dcm³ 1-butene and the 140 g of ethylene were replaced by 300 g of ethylene metered in under the stated conditions, i.e. over the course of 120 minutes and at 60° C. 4.5 kg of product were obtained having an MFI of 7.0 g/10 min (determined at 230° C. and 21.6 N) and having a butene content, according to IR, of 8,7% by weight, based on the weight of the polymer.
c) Granulation:
The granulation was carried out in the same way as in Example 1. The resultant granules had an MFI of 6.4 g/10 min, a melting point of 132° C. and a butene content, according to IR, of 9.0% by weight.

EXAMPLE 6

The copolymer was prepared analogously to Example 1.
a) Catalyst:
The catalyst was prepared in the same way as in Example 1.
b) Polymerization:
The polymerization was carried out as in Example 1, but the 60 g ethylene were metered in first were replaced by 1.25 dm³ 1-hexen and the 140 g of ethylene were replaced by 1.25 dm³ of 1-hexene metered in under the stated conditions, i.e. over the course of 120 minutes and at 60° C. 4.85 kg of product were obtained having an MFI of 3.9 g/10 min (determined at 230° C. and 21.6 N) and having a hexene content, according to IR, of 3.2% by weight, based on the weight of the polymer.
c) Granulation:
The granulation was carried out in the same way as in Example 1. The resultant granules had an MFI of 4.3 g/10 min, a melting point of 129° C. and a hexene content, according to IR, of 3.0% by weight.

B. PRODUCTION OF THE FILM

EXAMPLES

A three-layer BOPP film having an overall thickness of 20 μm and an ABA layer structure, i.e. the base layer B was surrounded at both sides by two outer layers of type A, was produced by coextrusion followed by stepwise orientation in the longitudinal and transverse directions. Before the film was rolled up, it was corona-treated on the take-off roll side with a dose of 15 Wmin/m². The surface tension on this side as a consequence of the corona treatment was 50 mN/m.

All layers were stabilized by 0.1% by weight of pentaerythrityl tetrakis [4-(3,5-di-tert-butyl-4-hydroxyphenyl) propionate] (®Irganox 1010) and were neutralized by 0.05% by weight of calcium stearate.

The base layer essentially comprised a propylene homopolymer having an n-heptane-soluble content of 3.5% by weight and a melting point of 162° C. The melt flow index of the propylene homopolymer was 3.3 g/10 min at 230° C. and below 21.6 N (DIN 53 735).

The polyolefinic outer layers A essentially comprised the granule mixtures from Examples 1 to 6. The outer layer A therefore contained 0.3% by weight of the antiblocking agent ®Sylobloc 44 having a mean particle diameter of 4 µm. The thickness of the outer layers A was 1.1 µm.

COMPARATIVE EXAMPLE 1

A three-layer BOPP film was produced analogously to the Examples. The polyolefinic outer layers A essentially comprised a random copolymer having a $C_2$ content of from 3 to 4% by weight and a melting point of 135° C. The melt flow index of the copolymer was 7 g/10 min, measured at 230° C. and a load of 21.6 N (DIN 53 735). Analogously to Example 1, the random copolymer also contained 0.3% by weight of the antiblocking agent ®Sylobloc 44 having a mean particle diameter of 4 µm. The thickness of the outer layers was 1.0 µm.

COMPARATIVE EXAMPLE 2

A three-layer BOPP film was produced analogously to the Examples. The polyolefinic outer layers A essentially comprised a random $C_2$–$C_3$–$C_4$-terpolymer ($C_2$ content from 1.5 to 2.5% by weight, $C_4$ content from 7 to 10% by weight) having a melting point of approximately 133° C. The melt flow index of the terpolymer was 6 g/10 min, measured at 230° C. and a load of 21.6 N (DIN 53 735). Analogously to Comparative Example 1 the random terpolymer also contained 0.3% by weight of the antiblocking agent ®Sylobloc 44 having a mean particle diameter of 4 µm. The thickness of the outer layers was 1.1 µm.

The properties of the films and their structure and composition are shown in Tables 2 to 14.

The following measurement methods were used in order to characterize the raw materials and the films:

Mean Molecular Weight and Molecular Weight Dispersity

The mean molecular weights ($M_w$, $M_n$) and mean molecular weight dispersity ($M_w/M_n$) were determined in accordance with DIN 55 672, Part 1, by gel permeation chromatography. Instead of THF, the eluent used was orthodichlorobenzene. Since the olefinic polymers to be investigated are insoluble at room temperature, the entire measurement was carried out at elevated temperature (≈135° C.).

Viscosity Number

The viscosity number is determined in accordance with DIN 53 728, Part 4.

Melt Flow Index

The melt flow index was measured in accordance with DIN 53 735 at a load of 21.6 N and at 2300° C.

Melting Point

DSC measurement, maximum of the melting curve, heating rate 20 K/min.

Haze

The haze of the film was measured in accordance with ASTM-D 1003-52.

Sheen

The sheet was determined in accordance with DIN 67 530. The reflector value was measured as an optical parameter for the surface of a film. In accordance with the ASTM-D 523-78 and ISO 2813 standards, the angle of incidence was set at 20° or 60°. A light beam hits the planar test surface at the set angle of incidence and is reflected or scattered thereby. The light beams incident on the photo-electronic receiver are indicated as a proportional electrical quantity. The measurement value is dimensionless and must be specified together with the angle of incidence.

Seal Seam Strength

For the measurement, two film strips 15 mm in width were laid one on top of the other and sealed for 0.5 s at 130° C. and a sealing pressure of 10 N/mm² (Brugger NDS unit, sealing jaws heated on one side). The seal seam strength was determined by the T-peel method.

Hot-Tack

"Hot-tack" denotes the strength of a still-hot seal seam immediately after the sealing tools are opened. For the measurement, two pieces of film measuring 5·30 mm are laid one on top of the other and fixed at the ends with a clamping weight G of 100 g. A flat spatula is inserted between the film layers, and the measurement strip is fed between the sealing jaws via two deflection rolls. The sealing is then initiated, the spatula being withdrawn from between the layers as soon as the sealing jaws have closed. The sealing conditions set are 150° C. for the sealing temperature, 0.5 s for the sealing time and 30 N/cm² for the pressure. At the end of the sealing time of 0.5 s, the sealing jaws (area 20 cm²) open automatically, and the sealed measurement strip is jerked forward by the loading weight as far as the deflection roll and at the same time peeled apart at a peel angle of 180°. The hot-tack is the depth of delamination of the sealed seam in mm experienced during the above action of force.

Surface Tension

The surface tension was determined by the ink method (DIN 53 364).

Printing Ink Adhesion/metal Adhesion

The corona-treated films were printed or metallized 14 days after production (short-term assessment) or 6 months after production (long-term assessment). The ink or metal adhesion was assessed by means of an adhesive tape test. If no ink or metal could be removed by means of an adhesive tape, the adhesion was assessed as very good and if a significant amount of ink or metal was removed, the adhesion was assessed as poor.

Determination of the Minimum Sealing Temperature (MST)

Heat-sealed samples (seal seam 20 mm×100 mm) are produced using a Brugger HSG/ET sealing unit by sealing a film at different temperatures with the aid of two heated sealing jaws at a sealing pressure of 10 N/cm² and a sealing time of 0.5 s. Test strips 15 mm in width are cut out of the sealed samples. The T-seal seam strength, i.e. the force necessary to separate the test strips, is determined using a tensile testing machine at a take-off rate of 200 mm/min, the seal seam plane forming a right angle with the tension direction. The minimum sealing temperature is the temperature at which a seal seam strength of at least 0.5 N/15 mm is achieved.

Random Ethylene Content

The random ethylene content of the copolymer was determined by IR spectroscopy, with the absorbance per mm being measured at 732 cm⁻¹ on test films approximately 350 µm in thickness. The assignment of the absorbences per mm to ethylene contents was carried out with the aid of a calibration curve based on ¹³C-NMR data. The random factor R is defined as the ratio between the absorbence per mm at 720 cm⁻¹ and 732 cm¹.

$$R = \frac{E_{(720\ cm^{-1})}}{E_{(732\ cm^{-1})}}$$

TABLE 2

| | Comparative Example 1 | Comparative Example 2 | Example 1 |
|---|---|---|---|
| Haze ASTM-D 1003-52 | 2.2–2.5 | 1.9–2.2 | 1.7–2.0 |
| Sheen (20°) DIN 67 530 | 101 | 90 | 105 |
| Sheen (60°) DIN 67 530 | 125 | 120 | 136 |
| Surface tension 15 W min/m$^2$ dose measured after 1 day [mN/m] | 47 | 44 | 50 |
| Minimum sealing temperature (10 N/cm$^2$; 0.5 s) [°C.] without corona treatment 15 Wmin/m$^2$ dose | 114 | 104 | 106 |
| Minimum sealing temperature (10 N/cm$^2$; 0.5 s) [° C.] with corona treatment 15 Wmin/m$^2$ dose | 116 | 112 | 108 |
| Hot-tack (without corona treatment) (150° C.; 30 N/cm$^2$; 0.5 s) [mm] | 6 | 6 | 6 |
| Seal seam strength (130° C.; 10 N/cm$^2$; 0.5 s) [N/15 mm] without corona treatment | 2.4 | 2.5 | 2.5 |
| Seal seam strength (130° C.; 10 N/cm$^2$; 0.5 s) [N/15 mm] with corona treatment Dose 15 Wmin/m$^2$ | 2.3 | 2.3 | 2.5 |
| Film thickness [μm] | 20.1 | 19.8 | 20.7 |
| Layer thickness A [μm] | 1.0 | 1.1 | 1.1 |
| Printing ink adhesion | good | moderate | very good |
| Metal adhesion | moderate | poor | very good |

TABLE 3

| | Comparative Example 1 | Comparative Example 2 | Example 2 |
|---|---|---|---|
| Haze ASTM-D 1003-52 | 2.2–2.5 | 1.9–2.2 | 1.5–1.9 |
| Sheen (20°) DIN 67 530 | 101 | 90 | 123 |
| Sheen (60°) DIN 67 530 | 125 | 120 | 149 |
| Surface tension 15 W min/m$^2$ dose measured after 1 day [mN/m] | 47 | 44 | 49 |
| Minimum sealing temperature (10 N/cm$^2$; 0.5 s) [° C.] without corona treatment 15 Wmin/m$^2$ dose | 114 | 104 | 108 |
| Minimum sealing temperature (10 N/cm$^2$; 0.5 s) [° C.] with corona treatment 15 Wmin/m$^2$ dose | 116 | 112 | 114 |
| Hot-tack (without corona treatment) (150° C.; 30 N/cm$^2$; 0.5 s) [mm] | 6 | 6 | 6 |
| Seal seam strength (130° C.; 10 N/cm$^2$; 0.5 s) [N/15 mm] without corona treatment | 2.4 | 2.5 | 2.3 |
| Seal seam strength (130° C.; 10 N/cm$^2$; 0.5 s) [N/15 mm] with corona treatment Dose 15 Wmin/m$^2$ | 2.3 | 2.3 | 2.2 |
| Film thickness [μm] | 20.1 | 19.8 | 19.9 |
| Layer thickness A [μm] | 1.0 | 1.1 | 1.1 |
| Printing ink adhesion | good | moderate | very good |
| Metal adhesion | moderate | poor | very good |

TABLE 4

| | Comparative Example 1 | Comparative Example 2 | Example 3 |
|---|---|---|---|
| Haze ASTM-D 1003-52 | 2.2–2.5 | 1.9–2.2 | 1.5–1.8 |
| Sheen (20°) DIN 67 530 | 101 | 90 | 127 |
| Sheen (60°) DIN 67 530 | 125 | 120 | 148 |
| Surface tension 15 W min/m$^2$ dose measured after 1 day [mN/m] | 47 | 44 | 49 |
| Minimum sealing temperature (10 N/cm$^2$; 0.5 s) [° C.] without corona treatment 15 Wmin/m$^2$ dose | 114 | 104 | 106 |
| Minimum sealing temperature (10 N/cm$^2$; 0.5 s) [° C.] with corona treatment 15 Wmin/m$^2$ dose | 116 | 112 | 112 |
| Hot-tack (without corona treatment) (150° C.; 30 N/cm$^2$; 0.5 s) [mm] | 6 | 6 | 5 |
| Seal seam strength (130° C.; 10 N/cm$^2$; 0.5 s) [N/15 mm] without corona treatment | 2.4 | 2.5 | 2.5 |
| Seal seam strength (130° C.; 10 N/cm$^2$; 0.5 s) [N/15 mm] with corona treatment Dose 15 Wmin/m$^2$ | 2.3 | 2.3 | 2.5 |

TABLE 4-continued

| | Comparative Example 1 | Comparative Example 2 | Example 3 |
|---|---|---|---|
| Film thickness [μm] | 20.1 | 19.8 | 19.6 |
| Layer thickness A [μm] | 1.0 | 1.1 | 1.1 |
| Printing ink adhesion | good | moderate | very good |
| Metal adhesion | moderate | poor | very good |

TABLE 5

| | Comparative Example 1 | Comparative Example 2 | Example 4 |
|---|---|---|---|
| Haze ASTM-D 1003-52 | 2.2–2.5 | 1.9–2.2 | 1.4–1.8 |
| Sheen (20°) DIN 67 530 | 101 | 90 | 121 |
| Sheen (60°) DIN 67 530 | 125 | 120 | 150 |
| Surface tension 15 W min/m² dose measured after 1 day [mN/m] | 47 | 44 | 48 |
| Minimum sealing temperature (10 N/cm²;0.5 s) [° C.] without corona treatment 15 Wmin/m² dose | 114 | 104 | 112 |
| Minimum sealing temperature (10 N/cm²;0.5 s) [° C.] with corona treatment 15 Wmin/m² dose | 116 | 112 | 116 |
| Hot-tack (without corona treatment) (150° C.; 30 N/cm²; 0.5 s) [mm] | 6 | 6 | 6 |
| Seal seam strength (130° C.; 10 N/cm²; 0.5 s) [N/15 mm] without corona treatment | 2.4 | 2.5 | 2.3 |
| Seal seam strength (130° C.; 10 N/cm²; 0.5 s) [N/15 mm] with corona treatment Dose 15 Wmin/m² | 2.3 | 2.3 | 2.3 |
| Film thickness [μm] | 20.1 | 19.8 | 20.0 |
| Layer thickness A [μm] | 1.0 | 1.1 | 1.1 |
| Printing ink adhesion | good | moderate | very good |
| Metal adhesion | moderate | poor | very good |

TABLE 6

| | Comparative Example 1 | Comparative Example 2 | Example 5 |
|---|---|---|---|
| Haze ASTM-D 1003-52 | 2.2–2.5 | 1.9–2.2 | 1.6–1.8 |
| Sheen (20°) DIN 67 530 | 101 | 90 | 131 |
| Sheen (60°) DIN 67 530 | 125 | 120 | 156 |
| Surface tension 15 W min/m² dose measured after 1 day [mN/m] | 47 | 44 | 48 |
| Minimum sealing temperature (10 N/cm²;0.5 s) [° C.] without corona treatment 15 Wmin/m² dose | 114 | 104 | 106 |
| Minimum sealing temperature (10 N/cm²;0.5 s) [° C.] with corona treatment 15 Wmin/m² dose | 116 | 112 | 116 |
| Hot-tack (without corona treatment) (150° C.; 30 N/cm²; 0.5 s) [mm] | 6 | 6 | 7 |
| Seal seam strength (130° C.; 10 N/cm²; 0.5 s) [N/15 mm] without corona treatment | 2.4 | 2.5 | 2.7 |
| Seal seam strength (130° C.; 10 N/cm²; 0.5 s) [N/15 mm] with corona treatment Dose 15 Wmin/m² | 2.3 | 2.3 | 2.0 |
| Film thickness [μm] | 20.1 | 19.8 | 19.6 |
| Layer thickness A [μm] | 1.0 | 1.1 | 1.1 |
| Printing ink adhesion | good | moderate | very good |
| Metal adhesion | moderate | poor | very good |

TABLE 7

| | Comparative Example 1 | Comparative Example 2 | Example 6 |
|---|---|---|---|
| Haze ASTM-D 1003-52 | 2.2–2.5 | 1.9–2.2 | 1.3–1.6 |
| Sheen (20°) DIN 67 530 | 101 | 90 | 130 |
| Sheen (60°) DIN 67 530 | 125 | 120 | 155 |
| Surface tension 15 W min/m² dose measured after 1 day [mN/m] | 47 | 44 | 47 |
| Minimum sealing temperature (10 N/cm²;0.5 s) [° C.] without corona treatment 15 Wmin/m² dose | 114 | 104 | 110 |
| Minimum sealing temperature (10 N/cm²;0.5 s) [° C.] with corona treatment 15 Wmin/m² dose | 116 | 112 | 116 |

TABLE 7-continued

|  | Comparative Example 1 | Comparative Example 2 | Example 6 |
|---|---|---|---|
| Hot-tack (without corona treatment) (150° C.; 30 N/cm²; 0.5 s) [mm] | 6 | 6 | 4 |
| Seal seam strength (130° C.; 10 N/cm²; 0.5 s) [N/15 mm] without corona treatment | 2.4 | 2.5 | 2.8 |
| Seal seam strength (130° C.; 10 N/cm²; 0.5 s) [N/15 mm] with corona treatment Dose 15 Wmin/m² | 2.3 | 2.3 | 2.2 |
| Film thickness [μm] | 20.1 | 19.8 | 19.5 |
| Layer thickness A [μm] | 1.0 | 1.1 | 1.1 |
| Printing ink adhesion | good | moderate | very good |
| Metal adhesion | moderate | poor | very good |

TABLE 8

| Example 1 | Comparative Example 1 | Comparative Example 2 |
|---|---|---|
| Base layer B: Isotactic polypropylene | Base layer B: Polypropylene | Base layer B: Polypropylene |
| Outer layers A: random ethylene-propylene copolymer: $C_2$-content: 3.0% by weight | Outer layers A: random ethylene-propylene copolymer $C_2$-content: 3–4% by weight | Outer layers A: random ethylene-propylene butylene terpolymer $C_2$-content: 1.5–2.5% by weight $C_4$-content: 7–10% by weight |
| Mean molecular wt $M_w$ [g/mol]: $2.4 \cdot 10^5$ | $2.8 \cdot 10^5$ | $3.1 \cdot 10^5$ |
| Mean molecular wt $M_n$ [g/mol]: $1.2 \cdot 10^5$ | $7.4 \cdot 10^4$ | $5.85 \cdot 10^4$ |
| Molecular wt dispersity $M_w/M_n$: 2.0 | 3.8 | 5.3 |
| Melting point by DSC [° C.]: 128 | 135 | 135 |
| Melt flow index MFI (230° C., 21.6 N) in accordance with DIN 53 735 [g/10 min]: 6.0 | 7.0 | 6.0 |
| Viscosity No. VN [cm³/g]: 203 | 210 | 225 |
| Peroxidic degradation: no | yes | no |
| Film structure ABA | Film structure ABA | Film structure ABA |
| Film thickness: ≈20 μm | Film thickness: ≈20 μm | Film thickness: ≈20 μm |
| Outer layer thickness: 1.1 μm | Outer layer thickness: 1.0 μm | Outer layer thickness: 1.1 μm |

TABLE 9

| Example 2 | Comparative Example 1 | Comparative Example 2 |
|---|---|---|
| Base layer B: Isotactic polypropylene | Base layer B: Polypropylene | Base layer B: Polypropylene |
| Outer layers A: random ethylene-propylene copolymer: $C_2$-content: 5.0% by weight | Outer layers A: random ethylene-propylene copolymer $C_2$-content: 3–4% by weight | Outer layers A: random ethylene-propylene butylene terpolymer $C_2$-content: 1.5–2.5% by weight $C_4$-content: 7–10% by weight |
| Mean molecular wt $M_w$ [g/mol]: $1.96 \cdot 10^5$ | $2.8 \cdot 10^5$ | $3.1 \cdot 10^5$ |
| Mean molecular wt $M_n$ [g/mol]: $0.83 \cdot 10^5$ | $7.4 \cdot 10^4$ | $5.85 \cdot 10^4$ |
| Molecular wt dispersity $M_w/M_n$: 2.4 | 3.8 | 5.3 |
| Melting point by DSC [° C.]: 123.9 | 135 | 135 |
| Melt flow index MFI (230° C., 21.6 N) in accordance with DIN 53 735 [g/10 min]: 9.0 | 7.0 | 6.0 |
| Viscosity No. VN [cm³/g]: 185 | 210 | 225 |
| Peroxidic degradation: no | yes | no |
| Film structure ABA | Film structure ABA | Film structure ABA |
| Film thickness: ≈20 μm | Film thickness: ≈20 μm | Film thickness: ≈20 μm |
| Outer layer thickness: 1.1 μm | Outer layer thickness: 1.0 μm | Outer layer thickness: 1.1 μm |

TABLE 10

| Example 3 | Comparative Example 1 | Comparative Example 2 |
|---|---|---|
| Base layer B: Isotactic polypropylene | Base layer B: Polypropylene | Base layer B: Polypropylene |
| Outer layers A: random ethylene-propylene copolymer: $C_2$-content: 5.0% by weight | Outer layers A: random ethylene-propylene copolymer $C_2$-content: 3–4% by weight | Outer layers A: random ethylene-propylene butylene terpolymer $C_2$-content: 1.5–2.5% by weight $C_4$-content: 7–10% by weight |
| Mean molecular wt $M_w$ [g/mol]: $1.6 \cdot 10^5$ | $2.8 \cdot 10^5$ | $3.1 \cdot 10^5$ |
| Mean molecular wt $M_n$ [g/mol]: $0.62 \cdot 10^5$ | $7.4 \cdot 10^4$ | $5.85 \cdot 10^4$ |
| Molecular wt dispersity $M_w/M_n$: 2.6 | 3.8 | 5.3 |
| Melting point by DSC [° C.]: 121.6 | 135 | 135 |
| Melt flow index MFI (230° C., 21.6 N) in accordance with DIN 53 735 [g/10 min]: 19.0 | 7.0 | 6.0 |
| Viscosity No. VN [cm³/g]: 165 | 210 | 225 |
| Peroxidic degradation: no | yes | no |
| Film structure ABA | Film structure ABA | Film structure ABA |
| Film thickness: ≈20 μm | Film thickness: ≈20 μm | Film thickness: ≈20 μm |
| Outer layer thickness: 1.1 μm | Outer layer thickness: 1.0 μm | Outer layer thickness: 1.1 μm |

TABLE 11

| Example 4 | Comparative Example 1 | Comparative Example 2 |
|---|---|---|
| Base layer B: Isotactic polypropylene | Base layer B: Polypropylene | Base layer B: Polypropylene |
| Outer layers A: random ethylene-propylene | Outer layers A: random ethylene- | Outer layers A: random ethylene- |

TABLE 11-continued

| | Example 4 | Comparative Example 1 | Comparative Example 2 |
|---|---|---|---|
| copolymer: $C_2$-content: 5.0% by weight | propylene copolymer $C_2$-content: 3–4% by weight | propylene butylene terpolymer $C_2$-content: 1.5–2.5% by weight $C_4$-content: 7–10% by weight | |
| Mean molecular wt $M_w$ [g/mol]: $2.0 \cdot 10^5$ | $2.8 \cdot 10^5$ | $3.1 \cdot 10^5$ | |
| Mean molecular wt $M_n$ [g/mol]: $0.48 \cdot 10^5$ | $7.4 \cdot 10^4$ | $5.85 \cdot 10^4$ | |
| Molecular wt dispersity $M_w/M_n$: 4.3 | 3.8 | 5.3 | |
| Melting point by DSC [° C.]: 128.2 | 135 | 135 | |
| Melt flow index MFI (230° C., 21.6 N) in accordance with DIN 53 735 [g/10 min]: 11 | 7.0 | 6.0 | |
| Viscosity No. VN [cm³/g]: 180 | 210 | 225 | |
| Peroxidic degradation: no | yes | no | |
| Film structure ABA | Film structure ABA | Film structure ABA | |
| Film thickness: ≈20 μm | Film thickness: ≈20 μm | Film thickness: ≈20 μm | |
| Outer layer thickness: 1.1 μm | Outer layer thickness: 1.0 μm | Outer layer thickness: 1.1 μm | |

TABLE 12

| | Example 5 | Comparative Example 1 | Comparative Example 2 |
|---|---|---|---|
| Base layer B: | Base layer B: | Base layer B: | Base layer B: |
| Isotactic polypropylene | Polypropylene | Polypropylene | |
| Outer layers A: | Outer layers A: | Outer layers A: | |
| random ethylene-propylene copolymer: $C_4$-content: 9.0% by weight | random ethylene-propylene copolymer $C_2$-content: 3–4% by weight | random ethylene-propylene butylene terpolymer $C_2$-content: 1.5–2.5% by weight $C_4$-content: 7–10% by weight | |
| Mean molecular wt $M_w$ [g/mol]: $2.3 \cdot 10^5$ | $2.8 \cdot 10^5$ | $3.1 \cdot 10^5$ | |
| Mean molecular wt $M_n$ [g/mol]: $1.0 \cdot 10^5$ | $7.4 \cdot 10^4$ | $5.85 \cdot 10^4$ | |
| Molecular wt dispersity $M_w/M_n$: 2.3 | 3.8 | 5.3 | |
| Melting point by DSC [° C.]: 132 | 135 | 135 | |
| Melt flow index MFI (230° C., 21.6 N) in accordance with DIN 53 735 [g/10 min]: 6.4 | 7.0 | 6.0 | |
| Viscosity No. VN [cm³/g]: 217 | 210 | 225 | |
| Peroxidic degradation: no | yes | no | |
| Film structure ABA | Film structure ABA | Film structure ABA | |
| Film thickness: ≈20 μm | Film thickness: ≈20 μm | Film thickness: ≈20 μm | |
| Outer layer thickness: 1.1 μm | Outer layer thickness: 1.1 μm | Outer layer thickness: 1.1 μm | |

TABLE 13

| | Example 6 | Comparative Example 1 | Comparative Example 2 |
|---|---|---|---|
| Base layer B: | Base layer B: | Base layer B: | Base layer B: |
| Isotactic polypropylene | Polypropylene | Polypropylene | |
| Outer layers A: | Outer layers A: | Outer layers A: | |

TABLE 13-continued

| | Example 6 | Comparative Example 1 | Comparative Example 2 |
|---|---|---|---|
| random ethylene-propylene copolymer: $C_6$-content: 3.0% by weight | random ethylene-propylene copolymer $C_2$-content: 3–4% by weight | random ethylene-propylene butylene terpolymer $C_2$-content: 1.5–2.5% by weight $C_4$-content: 7–10% by weight | |
| Mean molecular wt $M_w$ [g/mol]: $2.6 \cdot 10^5$ | $2.8 \cdot 10^5$ | $3.1 \cdot 10^5$ | |
| Mean molecular wt $M_n$ [g/mol]: $1.2 \cdot 10^5$ | $7.4 \cdot 10^4$ | $5.85 \cdot 10^4$ | |
| Molecular wt dispersity $M_w/M_n$: 2.2 | 3.8 | 5.3 | |
| Melting point by DSC [° C.]: 129 | 135 | 135 | |
| Melt flow index MFI (230° C., 21.6 N) in accordance with DIN 53 735 [g/10 min]: 4.3 | 7.0 | 6.0 | |
| Viscosity No. VN [cm³/g]: 225 | 210 | 225 | |
| Peroxidic degradation: no | yes | no | |
| Film structure ABA | Film structure ABA | Film structure ABA | |
| Film thickness: ≈20 μm | Film thickness: ≈20 μm | Film thickness: ≈20 μm | |
| Outer layer thickness: 1.1 μm | Outer layer thickness: 1.1 μm | Outer layer thickness: 1.1 μm | |

TABLE 14

Surface tension of corona-treated 3-layer films having outer layers as in Comparative Example 1, Comparative Example 2 and the Examples 1 to 6 as a function of time.

| Surface tension [mN/m] | 1st Day | 4th Week | 20th Week |
|---|---|---|---|
| Comparative Example 1 | 47 | 40 | 38 |
| Comparative Example 2 | 44 | 38 | 36 |
| Example 1 | 50 | 43 | 43 |
| Example 2 | 49 | 44 | 43 |
| Example 3 | 49 | 45 | 43 |
| Example 4 | 48 | 43 | 42 |
| Example 5 | 48 | 42 | 41 |
| Example 6 | 47 | 43 | 42 |

Corona dose: 15 Wmin/m²

What is claimed is:

1. A heat-sealable, multilayer film comprising a polyolefinic base layer and at least one outer heat-sealable layer, wherein the outer heat-sealable layer comprises an essentially random propylene-olefin copolymer prepared by means of a metallocene/aluminoxane catalyst wherein the metallocene carries, as ligands, substituted or unsubstituted indenyl groups bonded to one another via a heteroatom-containing bridge, said copolymer having a melting point in the range of from 100 to 145° C. as determined by differential scanning calorimetry, a ratio of block content to random content which is less than 0.4, a random comonomer content of from 0.1 to 10% by weight, a melt flow index, measured in accordance with DIN 53 735, in the range of 0.5 to 100 g/10 min at 230° C. and a 21.6 N load and a molecular weight dispersity, $M_w/M_n$, of <7.

2. A film as claimed in claim 1, wherein the olefin of said propylene-olefin copolymer is ethylene.

3. A film as claimed in claim 1, wherein the weight-average mean molecular weight $M_w$ of the copolymer is in the range from $5 \cdot 10^4$ to $2 \cdot 10^6$ g/mol.

4. A film as claimed in claim 1, wherein the number-average mean molecular weight $M_n$ of the copolymer is in the range from $5 \cdot 10^4$ to $1 \cdot 10^6$ g/mol.

5. A film as claimed in claim 1, wherein the molecular weight dispersity of the copolymer $M_w/M_n$ is <7.

6. A film as claimed in claim 1, wherein the differential scanning calorimetry melting point of the copolymer is from 100 to 145° C.

7. A film as claimed in claim 1, wherein the melt flow index MFI, measured in accordance with DIN 53 735, is from 0.5 to 100 g/10 min, at 230° C., load=21.6 N.

8. A film as claimed in claim 1, wherein the n-hexane-extractable content of the copolymer, measured in accordance with FDA 1771520 is <3% by weight.

9. A film as claimed in claim 1, wherein the viscosity number VN is in the range from 50 to 1,000 cm³/g.

10. A film as claimed in claim 1, wherein said base layer of said film comprises a propylene polymer containing at least 90% of propylene; has a melt flow index of from 0.5 g/10 min to 8 g/10 min, measured in accordance with DIN 53 735; and has a melting point of from 150 to 170° C.

11. A film as claimed in claim 1, wherein the base layer contains inert inorganic and/or organic particles.

12. A film as claimed in claim 1, wherein the base layer contains an additive, said additive comprising a resin having a lower molecular weight as compared to the polymers which form the principal components of the individual film layers.

13. A film as claimed in claim 1, wherein the film has at least three layers.

14. A film as claimed in claim 1, wherein the outer layer has a thickness of from 0.1 to 2.5 µm.

15. A heat-sealable, multilayer film as claimed in claim 11, wherein the mean molecular weight of said copolymer is at least $5 \cdot 10^4$ g/mol, and the n-hexane extractable content, measured in accordance with FDA 1771520, is <3% by weight.

16. A heat-sealable, multilayer film as claimed in claim 1, wherein viscosity number, VN is in the range of 50 to 1,000 cm³/g.

17. A process for the production of a film as claimed in claim 1, comprising the following steps:

coextruding melts corresponding to the individual layers of the film through a flat-film die, at least one of the resulting layers comprising a said propylene-olefin copolymer prepared by means of a said metallocene-containing catalyst, cooling the coextruded film for solidification by taking off the coextruded film over a take-off roll whose temperature is between 10 and 90° C., and biaxially stretching the resulting film at a longitudinal stretching ratio of from 4:1 to 7:1 and a transverse stretching ratio of from 8:1 to 10:1.

18. The process as claimed in claim 17, wherein the resulting biaxially-stretched film is corona- or flame-treated and subsequently wound up.

19. A method for packaging an item, comprising the step of packaging the item with a packaging film, said packaging film comprising a film as claimed in claim 1.

* * * * *